L. E. WATERMAN.
HAY RAKE AND TEDDER.
APPLICATION FILED DEC. 15, 1914.
1,159,444.
Patented Nov. 9, 1915.
2 SHEETS—SHEET 2.
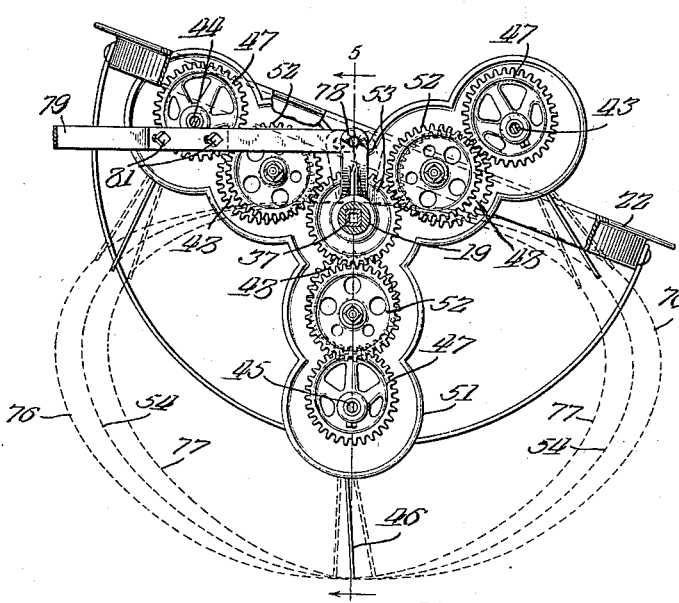
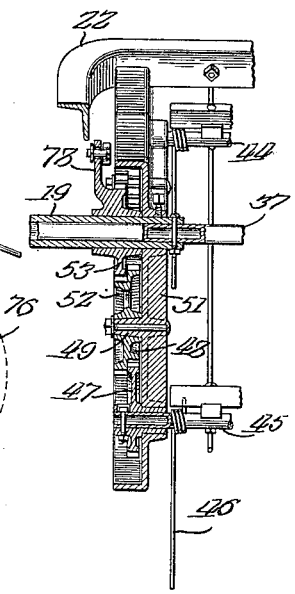
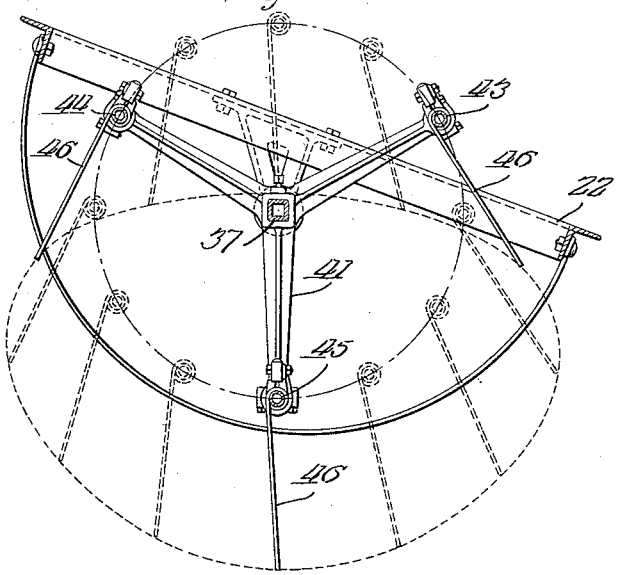

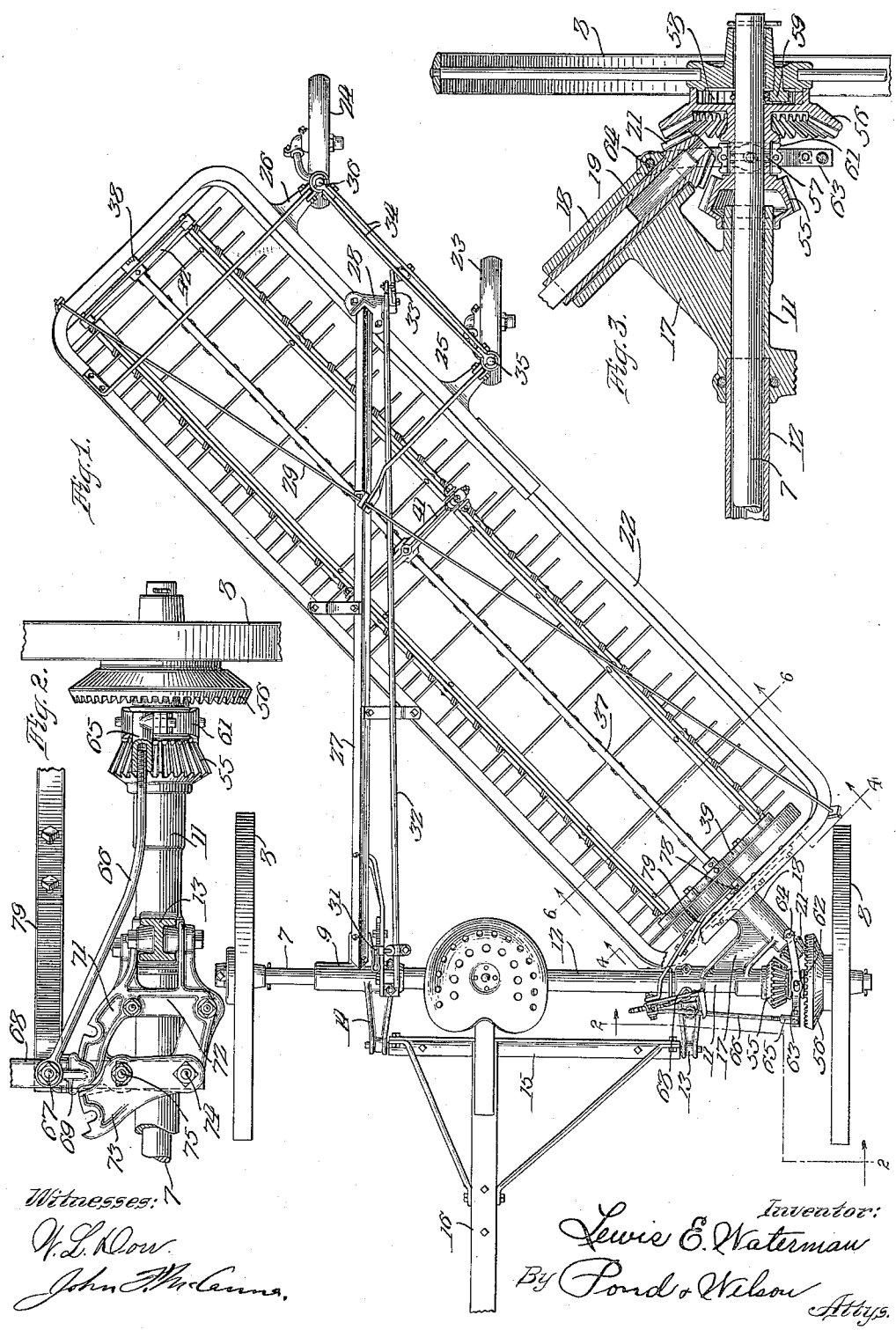

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

HAY RAKE AND TEDDER.

1,159,444. Specification of Letters Patent. Patented Nov. 9, 1915.

Application filed December 15, 1914. Serial No. 877,416.

*To all whom it may concern:*

Be it known that I, LEWIS E. WATERMAN, a citizen of the United States, residing at Rockford, in the county of Winnebago and State of Illinois, have invented certain new and useful Improvements in Hay Rakes and Tedders, of which the following is a specification.

This invention relates in general to hay rakes and tedders of the side delivery type and has more particular reference to the mechanism for controlling the direction of rotation of the tine or tooth carrying frame and for varying the normal angle of the teeth with respect to the frame, this invention being an improvement upon the mechanism disclosed in my prior Patent 1,072,677 patented Sept. 9, 1913.

The mechanism illustrated in my prior patent embodied one controlling lever for reversing the direction of rotation of the tooth carrying frame to convert the machine from a rake to a tedder and, vice versa, and another controlling lever by means of which the normal angle of the teeth with respect to the rotating frame might be varied. The necessity of changing the angle of the teeth when the direction of rotation of the frame is reversed is imperative in order to secure the most efficient and satisfactory results from the operation of the machine. The use of the machine by unskilled operators developed the fact that frequently when the direction of rotation of the frame was reversed, the operator would neglect to correspondingly vary the angle of the teeth or would set them at an angle which was not conducive to the best results.

My present invention has for its primary object therefore the provision of mechanism whereby the angle of the teeth is automatically changed by the operation of reversing the rotating frame so that the teeth are always disposed at the proper angle when the machine is in operation.

Another object of the invention is to provide novel and efficient mechanism for reversing the direction of rotation of the tooth carrying frame.

A further object is to provide adequate adjustment of the reversing mechanism in order that the proper intermeshing engagement between the coöperating bevel gears may be maintained even when the parts become somewhat worn by use.

My invention and one of its practical and preferred embodiments will be best understood by reference to the following description when considered in connection with the accompanying drawings throughout the various views of which like reference characters refer to similar parts.

Referring to the drawings:—Figure 1 is a plan view of a combined side delivery rake and tedder embodying my invention; Fig. 2 is a fragmentary sectional view taken on the line 2—2 of Fig. 1; Fig. 3 is a horizontal sectional view of the rotatable frame driving mechanism; Fig. 4 is a view taken on the line 4—4 of Fig. 1; Fig. 5 is a sectional view taken on the line 5—5 of Fig. 4; and Fig. 6 is a sectional view taken on the line 6—6 of Fig. 1.

By reference to the drawings it will be observed that the front end of the frame is carried upon an axle 7 supported by wheels 8 connected to the axle at each end thereof by pawl and ratchet mechanism of any preferred construction. Collars 9 and 11 journaled on the axle 7 are rigidly connected together by a sleeve 12 so that said collars and the parts carried thereby are capable of a limited movement longitudinally of the axle. The collars are provided with forwardly extending arms 13 and 14 between which the pole frame 15 carrying the pole 16 is supported in a well known manner.

The collar 11 is provided with a rearwardly extending bracket 17 providing a journal bearing 18 for a hollow shaft 19 carrying at its forward end a bevel pinion 21. An elongated substantially rectangular frame 22 is supported at its forward end upon the bracket 17 and at its rear end upon a pair of castor wheels 23 and 24 which carry the rear end of the frame through the instrumentality of the brackets 25 and 26. The frame 22 is further strengthened and supported by a bar 27 extending rearwardly from the collar 9 over the frame to a bracket 28. A tie rod 29 also assists in maintaining the rigidity of the frame. The rear end of the frame may be raised and lowered by means of a handle 31 through suitable mechanism of well known construction, preferably comprising a rod 32 attached at its forward end to the handle and at its rear end to a bell-crank lever 33, also connected with the bars 34 attached to the caster wheel posts 35 and 36.

A square shaft 37 has its forward end slidably engaged in and supported by the hollow shaft 19, the shaft 37 being journaled at its rear end in a bearing 38 carried by the frame 22.

A frame comprising the spiders 39, 41 and 42 and the shafts 43, 44 and 45 carried at the other ends of the spiders is fixed on the shaft 37 to rotate therewith. Each of the shafts 43, 44 and 45 is equipped with a plurality of tines or spring teeth 46 adapted to engage with the hay or other material being raked or tedded as the frame revolves. The forward end of each of the shafts 43, 44 and 45 has fixedly mounted thereon an elliptical gear 47 which gears mesh respectively, with eccentric elliptical gears 48 journaled on studs 49 projecting from a housing 51 carried by the rear end of the hollow shaft 19. Each elliptical gear 48 is formed integrally with a concentric gear 52 meshing with a central gear 53 loosely mounted on the shaft 19 adjacent to the housing 51. The gear 53 is held stationary in the desired one of its adjusted positions by mechanism which will be later described. It will be manifest that when the gear is in the position shown in Fig. 4 and the frame carried by the shaft 37 is revolved, the extremities of the teeth will travel in the path shown in dotted lines indicated by reference character 54. The mechanism thus far described and its mode of operation are in all respects substantially like that illustrated in my prior patent to which reference has previously been made.

The mechanism for driving or rotating the tooth carrying frame is best shown in Figs. 1 to 3 inclusive, from which it will be observed that the pinion 21 when in neutral or inoperative position is disposed between and out of mesh with the two opposed bevel gears 55 and 56 integrally connected together and fixed by pin 57 or otherwise on the axle 7. The outer end of the hub of gear 56 is shaped to form an interiorly toothed drum 58 with which a spring pressed pawl 59 carried by the hub of the wheel 8 coöperates to drive the gears in one direction. The connecting sleeve between the gears 55 and 56 is grooved to receive a split-ring collar 61 having oppositely projecting pins 62 engaged by a forked lever 63. One arm of the lever is fulcrumed at 64 to the bearing 18 so that when said lever is swung on its fulcrum, the axle 7 will be moved axially in the collars 9 and 11 and the connecting sleeve 12 to bring either the gear 55 or 56 into mesh with the pinion 21, as desired. It will be noted that both wheels 8 are held from axial movement on the axle by pins passing therethrough at the ends of the wheel hubs with the exception that the wheel shown in Fig. 3 is held from movement to the left on the axle by reason of the wheel engaging the gear 56 which is fixed on the axle by pin 57. The other arm of lever 63 is equipped with a threaded socket 65 adapted to receive the correspondingly threaded end of a link or rod 66 attached at its other end by a bolt 67 to a manually operable controlling lever 68 equipped with a hand controlled latch 69 adapted to engage in any of the three notches in a sector 71 fixed on the sleeve 11 thereby locking the lever in adjusted position. From Fig. 2 it will be seen that the sector 71 comprises two parts, that is the fixed part 72 and the adjustable part 73 pivoted to the fixed part at 74 and adjustably held in the desired position by slot and bolt connection 75. When the parts are assembled, the rod 66 is threaded into the socket 65 the requisite distance to bring the bevel gear 55 into proper meshing relation with the pinion 21 when the handle is moved to the right viewing Fig. 2 so that the latch 69 engages in the right hand notch. The lever is then moved to the left on its pivot to bring the bevel gear 56 into proper meshing relation with the pinion 21 and the adjustable part 73 of the sector is then adjusted so that its notch will be engaged by the latch 69 whereupon the bolt 75 is tightened up to hold the parts in their adjustable position. It will thus be manifest that adequate adjustability is afforded to insure proper intermeshing coöperation between the bevel gears and the pinion when the parts have become somewhat worn by continued use.

In order that the teeth may lift the hay and not drag over it when the machine is in operation it is desirable that the normal angle of the teeth be such that their extremities will be inclined forwardly, or in other words in the direction of rotation of the tooth carrying frame. To illustrate this feature I have shown in Fig. 4 three paths in which the teeth will travel. If the gear 53 is in the position shown in full lines in this figure, the ends of the teeth will travel in the path indicated by reference character 54 as previously explained. When the machine is used as a rake, the frame will be rotated in a clockwise direction viewing Fig. 4, and it is then desirable that the teeth travel in the dotted line path indicated by reference character 76. When the machine is used as a tedder the frame rotates in a counter-clockwise direction and it is then desirable that the normal angle of the teeth be changed so that their extremities will travel in the path indicated by reference character 77. This variation in the angle of the teeth is accomplished by a slight rotative adjustment of the gear wheel 53. This gear is therefore provided with an upwardly extending arm 78 which is connected by means of a link 79 with the hand lever 68 so that when this lever is manipulated to bring the desired bevel gear into mesh with the pinion the gear wheel 53 simultaneously and automatically receives a slight rotative adjusting movement which imparts the requisite adjustment to the teeth to give them the desired angle. Should the hand lever 68 be moved to the left viewing Fig. 2 to engage the bevel gear 56 with the pinion 21, thus converting the machine into a tedder, the lever 78 will be moved by the lever 68 into the dotted line position shown in Fig. 4 to angle the teeth so that they will travel in the path 77 as previously explained. It will be obvious that to convert the machine from a tedder into a side delivery rake, the lever 68 may be moved to the right, bringing the bevel gear 55 into mesh with the pinion 21 and causing the rake teeth to travel in path 76. The connecting link 79 is preferably made in two parts connected by set screws 81 so that this link is capable of adjustment as to length to secure the requisite inclination of the teeth.

It should be manifest from the foregoing that I have provided simple and efficient mechanism by means of which the machine may be quickly converted from a rake to a tedder and, vice versa, and which upon such conversion will simultaneously and automatically change the position of the teeth so that they will be disposed at the requisite angle to most efficiently accomplish the desired results. It should be understood, however, that while I have shown and described for purposes of illustration a preferred embodiment of this invention, it is not circumscribed by the details of construction employed for purposes of illustration, but is capable of considerable modification and variation in structure within the scope of the appended claims.

I claim:

1. In a combined hay rake and tedder, the combination of a rotatable frame, teeth pivotally mounted thereon, and means including and operated by a single lever for simultaneously reversing the direction of rotation of said frame and varying the angle of said teeth with respect to the frame.

2. In a combined rake and tedder, the combination of a rotatable frame, means for rotating said frame, teeth carried by said frame, means for reversing the direction of rotation of said frame, and connections between said means and said teeth whereby the positions of the teeth on the frame are changed upon actuation of said means.

3. In a combined rake and tedder, the combination of a rotatable frame, a plurality of rows of teeth adjustably mounted on said frame, mechanism for rotating the frame, a lever, and means operable from said lever for controlling the rotation of said frame and for adjusting the position of the teeth upon said frame.

4. In a combined rake and tedder, the combination of a rotatably mounted frame, means for rotating the frame, teeth pivoted upon the periphery of said frame, a controlling lever, mechanism operable by said lever to change the direction of rotation of the frame, and means for automatically changing the angle of said teeth with respect to the frame when the direction of the rotation of the frame is reversed.

5. In a combined rake and tedder, the combination of a rotatably mounted frame, means for rotating said frame, teeth mounted upon the periphery of the frame, means for continuously changing the angle of said teeth with respect to the frame as the frame rotates, mechanism for reversing the direction of rotation of the frame, and means for automatically changing the normal position of the teeth with respect to the frame upon reversal of the frame.

6. In a combined rake and tedder, the combination of a shaft, a frame carried thereby, teeth mounted upon the periphery of said frame, means for rotating the shaft in either direction, a gear wheel journaled on the shaft at one end of the frame, gear connections between said gear wheel and said teeth whereby the positions of the teeth with respect to the frame are changed, means for reversing the direction of rotation of said shaft, and a connection between said means and said gear wheel whereby said gear wheel is operated to change the angle of said teeth with respect to the frame upon actuation of said means.

7. In a combined rake and tedder, the combination of a pair of bevel gears spaced apart and movable axially in unison, means for rotating said gears, a pinion with which either of said gears may mesh, a rotatable frame operatively connected with said pinion, rake teeth mounted on said frame, a lever for moving said gears axially whereby to move either of the gears into engagement with the pinion, mechanism for actuating said lever, and connections between said mechanism and said teeth whereby the angle of the teeth with respect to the frame is changed upon movement of said gear-operating lever.

8. In a combined rake and tedder, the combination of a rotary rake head, a pair of spaced gears, means for rotating said gears, a pinion gear disposed intermediate said spaced gears adapted to be driven by either of the said gears and being in driving connection with the rotary rake head, and means for moving the gears and pinion relatively to effect either of said driving connections, comprising a controlling lever, a sector with which the lever coöperates, the sector having a notch for holding the lever in a set position when the pinion is in mesh with one of the gears and having an adjustable portion provided with a notch for holding the lever set when the pinion is in mesh with the other gear.

LEWIS E. WATERMAN.

Witnesses:
JOHN F. McCANNA,
DELLA ATKINSON.

Copies of this patent may be obtained for five cents each, by addressing the "Commissioner of Patents, Washington, D. C."